UNITED STATES PATENT OFFICE.

ROBERT LANCE, OF PARIS, FRANCE.

TREATMENT OF ZINC SOLUTIONS FOR THE RECOVERY OF THE METAL THEREFROM.

1,198,241. Specification of Letters Patent. Patented Sept. 12, 1916.

No Drawing. Application filed June 24, 1914. Serial No. 846,995.

*To all whom it may concern:*

Be it known that I, ROBERT LANCE, a citizen of the French Republic, and residing at 332 Rue Saint-Honoré, Paris, France, chemist, have invented certain new and useful Improvements in and Relating to the Treatment of Zinc Solutions for the Recovery of the Metal Therefrom, of which the following is a complete specification.

This invention has for its object to provide an improved process for the treatment of zinc solutions for the purpose of recovering the metal therefrom preferably in the form of oxid.

It has already been proposed for the purpose of extracting zinc from a solution of zinc sulfate or any other zinc salt, to add to the solution an acid solution of calcium bisulfite. The reaction causes a precipitation of sulfate of lime, the zinc remaining in solution in the form of bisulfite. After having separated out the sulfate of lime, the zinc sulfite is precipitated by removing the sulfurous acid which keeps it in solution. This sulfurous acid joined to the sulfurous acid derived from the calcination of the sulfite, allows of producing anew by known means the acid solution of calcium bisulfite which is used, in the first reaction. The solution, namely the said acid solution of calcium-bisulfite is not a chemical combination, but is a solution of calcium sulfite in an aqueous solution of sulfurous acid. Its content in lime as in sulfurous acid is therefore necessarily variable. Since the solubility of zinc sulfite is different from that of calcium sulfite in the aqueous solution of sulfurous acid, it may happen that the composition of the solution will not allow of maintaining in solution the zinc sulfite produced by the decomposition of the zinc salt by calcium sulfite. In such a case the zinc is precipitated in the form of sulfite and the zinc sulfate of lime. At the same time the zinc solution from which the zinc is subsequently to be precipitated, is diluted to an extent which is always considerable. For the purpose of obviating this dilution it has already been proposed to modify the process by adding either in the from of quick lime or in the form of slaked lime or in the form of carbonate of lime, the quantity of lime which is necessary for fixing the sulfuric acid of the zinc sulfate when the sulfurous acid is subsequently introduced under pressure into the liquor. If lime (quick lime or slaked lime) is added to the solution of zinc sulfate, and the sulfurous acid is introduced afterward, then the reaction is limited to the precipitation of the zinc by the lime,

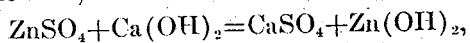

$$ZnSO_4 + Ca(OH)_2 = CaSO_4 + Zn(OH)_2,$$

and it is the precipitated hydrated oxid which is then redissolved by the sulfurous acid in excess. The precipitation is however not wholly in the form of hydroxid, and the first portions of hydrated oxid combine with the lime to produce calcium-zincate. On the other hand since the lime is employed in an insoluble state, the lime particles are immediately coated with a skin of sulfate of lime which being likewise insoluble will very quickly stop the reaction, and the solution of sulfate of zinc will diffuse with great difficulty through the crust of sulfate, which grows thicker and thicker. The action of the balls in the rotary apparatus obviously favors the reaction by crushing the precipitate, but this reaction is nevertheless still slow and incomplete. It necessitates the use of an additional quantity of lime and occasions a loss of zinc in the form of earthy alkaline zincate. If, as above stated, the reaction is effected by means of carbonate of lime, the above drawback will disappear because the carbonate of lime does not decompose the sulfate of zinc, and the reaction commences only in the presence of sulfurous acid. This reaction however liberates the carbonic acid so that in order to avoid a rise of pressure in the apparatus, it is necessary to blow off gas at frequent intervals which gas carries away with it not only the carbonic acid but also a suitable proportion of sulfurous acid which must be replaced.

The present invention now consists in treating solutions of zinc sulfate or of any other zinc salt with an anhydrous or hydrated earthy alkaline oxid in the presence of an excess of sulfurous acid. With this object, the solution of zinc sulfate or other zinc salt is saturated with sulfurous acid in a closed agitating apparatus with or without pressure or in a series of identically similar apparatus arranged in such a manner that they can act successively in a cycle, and to this solution while being agitated there is added the anhydrous or hydrated earthy alkaline oxid, care being taken that the added quantity of oxid shall always be less than that which is necessary for fixing approximately half of the dissolved sulfurous acid, in the form of earthy alkaline sulfite.

By way of example there will now be described the treatment of a solution of zinc sulfate with barium oxid. Under these conditions the barium oxid is at once converted into sulfite

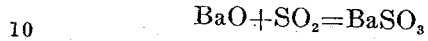
$$BaO + SO_2 = BaSO_3$$

and the sulfite thus formed reacts at once upon the zinc sulfate so as to produce by double decomposition barium sulfate and zinc sulfite, which latter remains in solution owing to the excess of sulfurous acid

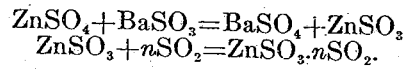
$$ZnSO_4 + BaSO_3 = BaSO_4 + ZnSO_3$$
$$ZnSO_3 + nSO_2 = ZnSO_3.nSO_2.$$

By regulating the introduction of the sulfurous acid and the barium oxid so as to always keep to the above stated proportions, the preceding three reactions will take place simultaneously without any disturbance, and the whole of the zinc will remain entirely in lution. These reactions can be readily arried into practice on the manufacturing scale by means of suitably adjusted dosing devices. Since the flow of sulfurous acid is continuous the sulfite of zinc will remain in solution owing to the excess of sulfurous acid, while the barium sulfate will be precipitated in the densest form resulting from the double decomposition between two salts. After filtering the solution for the purpose of separating out the sulfate, the sulfite solution is treated by any suitable means for the purpose of eliminating therefrom the sulfurous acid in excess and allowing of the precipitation of the zinc sulfite. This zinc sulfite when calcined will furnish the oxid while regenerating the sulfurous acid which on being added to the aforesaid quantity allows of restarting the working cycle. The barium sulfate when treated by ordinary means will regenerate the baryta which is employed in the first stage of the process. Thus by using suitable proportions of sulfurous acid and the earthy alkaline base, the operator is enabled to control the reactions in the very midst of the solution of zinc salts, and he can thus avoid all those disturbances which occur with the use of the proposed process hereinbefore referred to.

In the case of a solution of zinc chlorid, the earthy alkaline chlorid remains in solution, and therefore filtration is not necessary.

What I claim is:

1. The process of treating solutions containing sulfate of zinc, consisting in maintaining the zinc solutions saturated with sulfurous acid while adding gradually to the zinc solution during the treatment with sulfurous acid earthy alkaline oxid whereby the zinc sulfite formed is maintained in solution.

2. The process of treating solutions containing sulfate of zinc, consisting in maintaining in the zinc solutions an excess of sulfurous acid while adding to the zinc solution during the treatment with sulfurous acid earthy alkaline oxid substantially as and for the purpose set forth.

3. The process of treating solutions containing sulfate of zinc, consisting in passing continuously through the zinc solution sulfurous acid while adding to the zinc solution during the treatment with sulfurous acid earthy alkaline oxids, the addition of the alkaline oxid being such that it is always less in quantity than the quantity which is necessary for fixing in the form of sulfite about half of the dissolved sulfurous acid.

4. The process of treating solutions containing sulfate of zinc, consisting in passing continuously through the zinc solution, sulfurous acid under pressure, while adding to the zinc solution earthy alkaline oxid, the addition of the alkaline oxid being such that it is always less in quantity than the quantity which is necessary for fixing in the form of sulfite substantially half of the dissolved sulfurous acid.

In testimony whereof I have hereunto set my hand, at Paris (France), this tenth day of June, 1914.

ROBERT LANCE.

In the presence of two witnesses:
Chas. P. Pressly,
Louis Coquillat.